United States Patent [19]

Honda et al.

[11] Patent Number: 4,485,270

[45] Date of Patent: Nov. 27, 1984

[54] METHOD FOR TRANSMITTING A CHARGING SIGNAL

[75] Inventors: Isao Honda, Tokyo; Takafumi Shimizu, Kawasaki, both of Japan

[73] Assignee: Fujitsu Limited, Kawasaki, Japan

[21] Appl. No.: 419,926

[22] Filed: Sep. 20, 1982

[30] Foreign Application Priority Data

Sep. 30, 1981 [JP] Japan ................. 56-155922

[51] Int. Cl.$^3$ ............... H04Q 7/04; H04M 15/00
[52] U.S. Cl. ..................... 179/2 E; 455/53; 455/102; 455/116; 179/7 R
[58] Field of Search ............... 179/2 E, 2 EA, 2 EB, 179/2 EC, 7 R, 7.1 R, 7.1 TP, 8 R; 455/45, 102, 116, 53-57; 370/11

[56] References Cited

U.S. PATENT DOCUMENTS 3,513,264 5/1970 Baer ................. 179/2 EB

FOREIGN PATENT DOCUMENTS

| 14608 | 2/1970 | Japan ................. 179/2 E |
| 132202 | 11/1978 | Japan ................. 179/2 E |
| 1602461 | 11/1981 | United Kingdom ............ 179/2 E |

*Primary Examiner*—Gene Z. Rubinson
*Assistant Examiner*—W. J. Brady
*Attorney, Agent, or Firm*—Staas & Halsey

[57] ABSTRACT

In a system for transmitting a charging signal from an exchange to a telephone system together with a voice signal, radio equipment in the exchange side detects the charging signal sent from the exchange and encodes it into a pulse code signal comprising a plurality of continuous pulses. Thereafter, this pulse signal is modulated into a frequency signal outside the voice transmitting frequency band and then transmitted as a radio signal after it is superimposed on the voice signal. Radio equipment on the telephone side detects this charging signal carrier and demodulates it into the pulse code signal, then counts it and transfers the charging signal when the counted value reaches a specified value. In addition, the radio equipment in the exchange side previously executes a deep amplitude limitation only for the voice signal onto which the out-of-band frequency signal is superimposed, and, thereby, the charging signal superimposed is protected from degradation due to amplitude limitation by a limiter circuit provided in a stage preceding a modulator.

6 Claims, 7 Drawing Figures

METHOD FOR TRANSMITTING A CHARGING SIGNAL

BACKGROUND OF THE INVENTION

This invention relates to a method for transmitting a charging signal used for computing the cost of a call, and more particularly to a signal transmitting system where a telephone exchange and public telephone systems are connected via a radio link and the charging signal sent from the exchange is transmitted via radio equipment.

In a telephone service system connecting the exchange and the public telephone systems with the radio link, the charging signal generated by the exchange must be sent to the public telephone systems via the radio link. As this charging signal, a 50 Hz or 16 Hz signal or a polarity-inverting signal are used and charges are communicated to users by transmitting such a signal at particular time intervals.

This charging signal is transmitted during a conversation along with the voice signal and, therefore, it is essential to prevent interference with the voice signal caused by such a charging signal.

Moreover, because this signal is used for computing user charges, this charging signal must be transmitted with high reliability and must be provided in a manner which prevents an erroneous action by a charge processing circuit provided in the public telephone system.

When transmitting a voice signal, etc. utilizing radio equipment, the amplitude of an input signal is limited in a circuit preceding a modulator stage in order to operate the modulator of the radio equipment with sufficient dynamic range and to transmit the signal within a predetermined frequency band. Particularly, it is important to prevent the charging signal from disappearing due to this amplitude limitation in the stage preceding such a modulator, when transmitting the charging signal by superimposing it on the voice signal using a frequency signal outside the frequency band used for transmitting the voice signal which is used as the carrier for the charging signal.

SUMMARY OF THE INVENTION

This invention has as an object transmitting the charging signal using a frequency signal outside the voice transmitting frequency band (the out-of-band frequency) and preventing erroneous action by a charge processing circuit provided in the public telephone systems due to noise.

This invention also has as another object transmitting the charging signal carrier (the encoded charging signal modulated by the out-of-band frequency) reliably even when the voice signal, on which the charging signal carrier is superimposed, is subjected to amplitude limitation in a stage preceding a modulator circuit provided in the radio equipment for signal transmission and thereby insuring that the S/N ratio (signal to noise ratio) when the charging signal is not transmitted is not lowered.

In this invention, the radio equipment on the exchange side detects the charging signal sent from the exchange and encodes it into a pulse code signal comprising a plurality of continuous pulses in order to transmit the charging signal, sent from the exchange to the telephone side via the radio equipment, together with the voice signal. This pulse signal is modulated, by the frequency signal outside the frequency band for transmitting the voice signal and then transmitted. Simultaneously, the radio equipment on the telephone side detects the frequency signal outside this frequency band and demodulates it into the pulse code signal and counts the continuous pulses of the pulse code signal. When the counted value reaches a specified value, the radio equipment generates the charging signal and thereby regenerates the charging signal sent from the exchange and then transmits it to the telephone system.

In the present invention, moreover, a circuit which limits the amplitude of the voice signal more than that in the ordinary case is provided in the radio equipment on the exchange side, this amplitude limiter circuit is operated in synchronization with the charging signal carrier which is input in the desired time interval, threafter the charging signal carrier is superimposed on the amplitude-limited voice signal, and the signal is subjected to ordinary amplitude limitation and modulation, followed by transmission to the radio equipment on the telephone side.

DESCRIPTION OF THE PREFERRED EMBODIMENT

Figure 1:
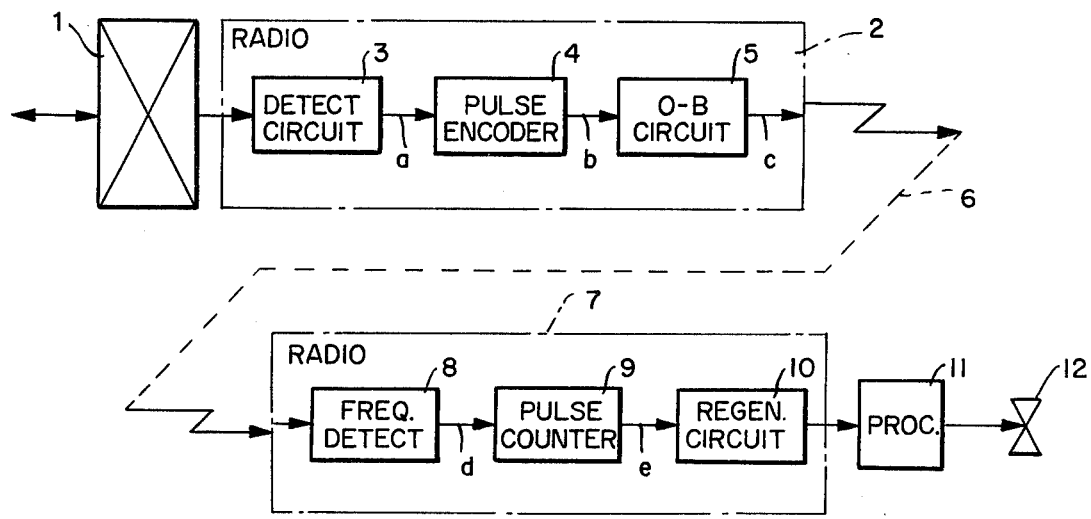
FIG. 1 is a block diagram of the transmission of a charging signal between the exchange and telephone system in the charging signal transmission system related to this invention.

FIG. 1 is a block diagram of a principal portion of an embodiment of this invention for transmitting the charging signal. The charging signal generated from an exchange 1 is detected by a charging signal detecting circuit 3 of radio equipment 2 and is encoded into a pulse code signal by a pulse encoder circuit 4. Here, the out-of-band frequency signal, for example, the signal of 3825 Hz for the voice band ranging from 200 Hz to 34 kHz, is generated in accordance with the pulse code signal from the out-of-band frequency generating circuit 5 and the out-of-band signal is modulated together with the voice signal and then transmitted via a radio link 6.

The radio equipment 7 on the side of public telephone set 12 detects and demodulates the 3825 Hz signal using the out-of-band frequency detecting circuit 8, and transfers it to a pulse counter circuit 9. Moreover, this equipment causes the charging signal generating circuit 10 to generate the charging signal by a control signal sent thereto when the counter values reaches a specified value. Then the charging signal is applied to a charging signal processing circuit 11.

Figure 2:
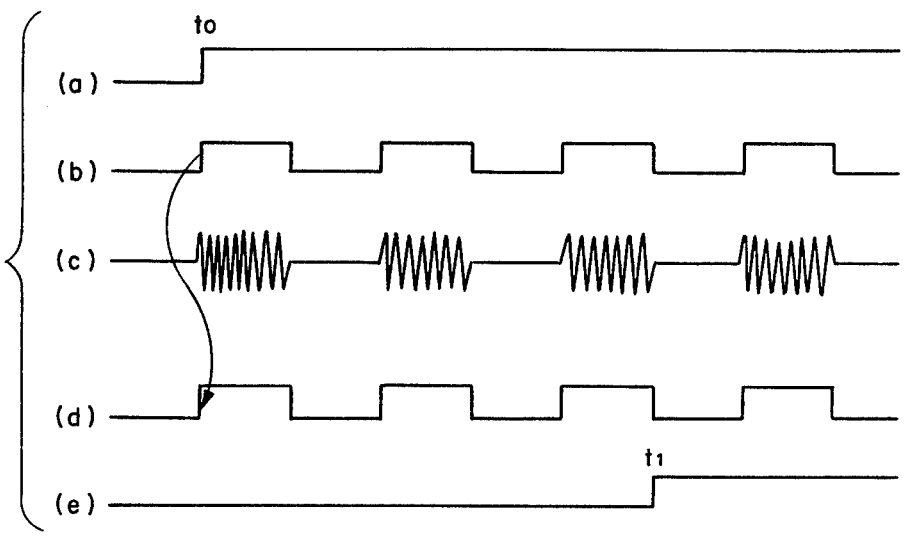
FIG. 2 is an output signal waveform diagram for respective points in the block diagram of FIG. 1.

FIG. 2 shows the waveforms for explaining the above-described operations. When the charging signal sent from the exchange 1 is detected a the time $t_0$ in the charging signal detecting circuit 3, a detected signal shown in FIG. 2(a) is output. When the detected signal is generated, the pulse encoding circuit 4 outputs the pulse code signal shown in FIG. 2(b). This pulse code signal, for example, has a duty radio of 50% and a period of 16 ms and comprises of continuous pulses. The out-of-band frequency generating circuit 5 outputs the signal of the out-of-band frequency such as 3825 Hz, etc. through a switching operation controlled by the pulse code signal and the output shown in FIG. 2(c) is obtained.

The radio equipment in the telephone side detects and demodulates the out-of-band frequency signal of 3825 Hz using the out-of-band frequency detecting circuit 8, and shapes the waveform and output the pulse code signal as shown in FIG. 2(d). The pulse counter circuit 9 counts the continuous pulses of this pulse code signal and starts the charging signal regenerating circuit 10, for example, by counting the pulses and outputs the charging signal at the time $t_1$ as shown in FIG. 2(e).

As explained above, because the charging signal is transmitted and received as the out-of-band frequency signal, no interference is caused with the voice signal. In addition, the charging signal is transmitted as the modulated pulse signal, the received signal is demodulated again into the pulse code signal and when this pulse code signal is continuously counted up to the specified value, the charging signal is confirmed as being received. Therefore, noise signals are no longer considered as the charging signal. Namely, the charging signal is generated in the radio equipment in the telephone side by checking the predetermined count value such as 3 to 5 pulses and, consequently, a momentary pulse signal due to noise in the out-of-band frequency, such as FM noise, ignition noise, etc., or a continuous signal can be distinguished, thus preventing an erroneous charging action.

Figure 3:
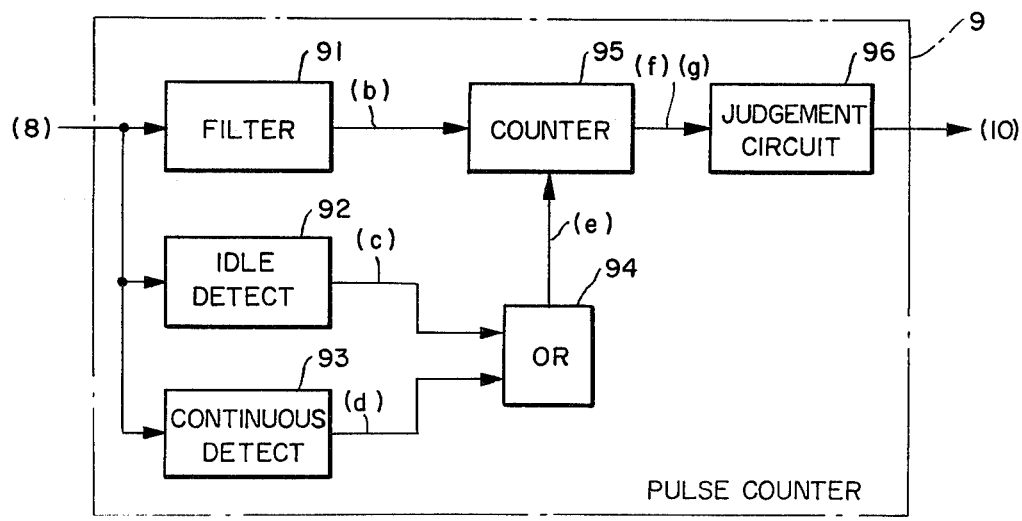
FIG. 3 is a block diagram of a pulse counter circuit used in this invention.

FIG. 3 is the block diagram of pulse counter circuit 9 of the radio equipment 7 shown in FIG. 1, where the pulse signal sent from the out-of-band frequency detecting circuit 8 is applied to the filter 91, idle condition detecting circuit 92 and continuous signal condition detecting circuit 93. The counter 95 counts the a pulse a signal sent from the filter 91 and is reset by the detecting signal from detecting circuits 92 and 93 via the OR circuit 94. A judgment output circuit 96 determines whether the count value of counter 95 reaches the specified value and outputs the start signal to the charging signal generating circuit 10.

Figure 4:
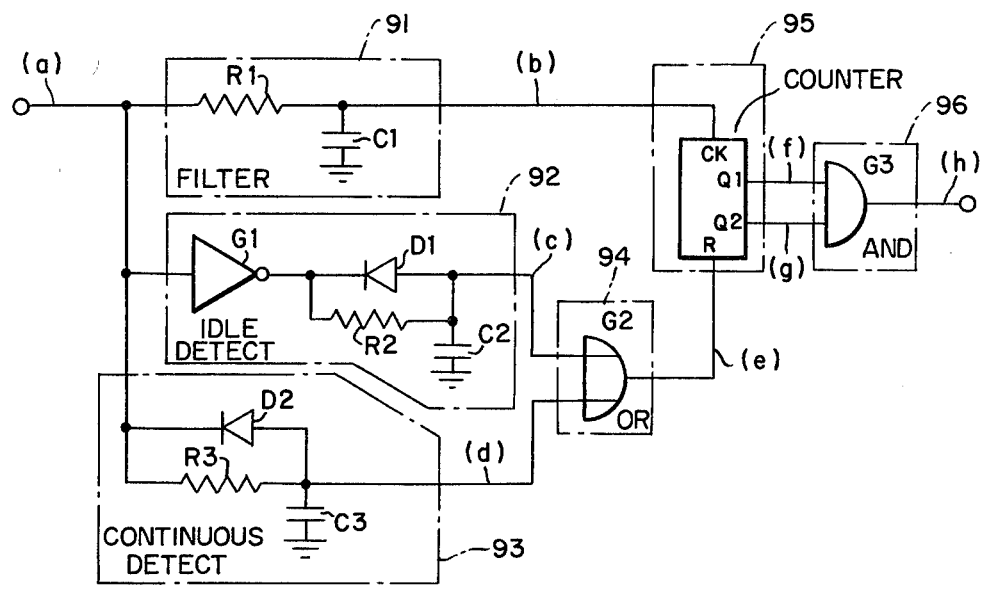
FIG. 4 is a detailed circuit diagram of this pulse counter circuit.
Figure 5:
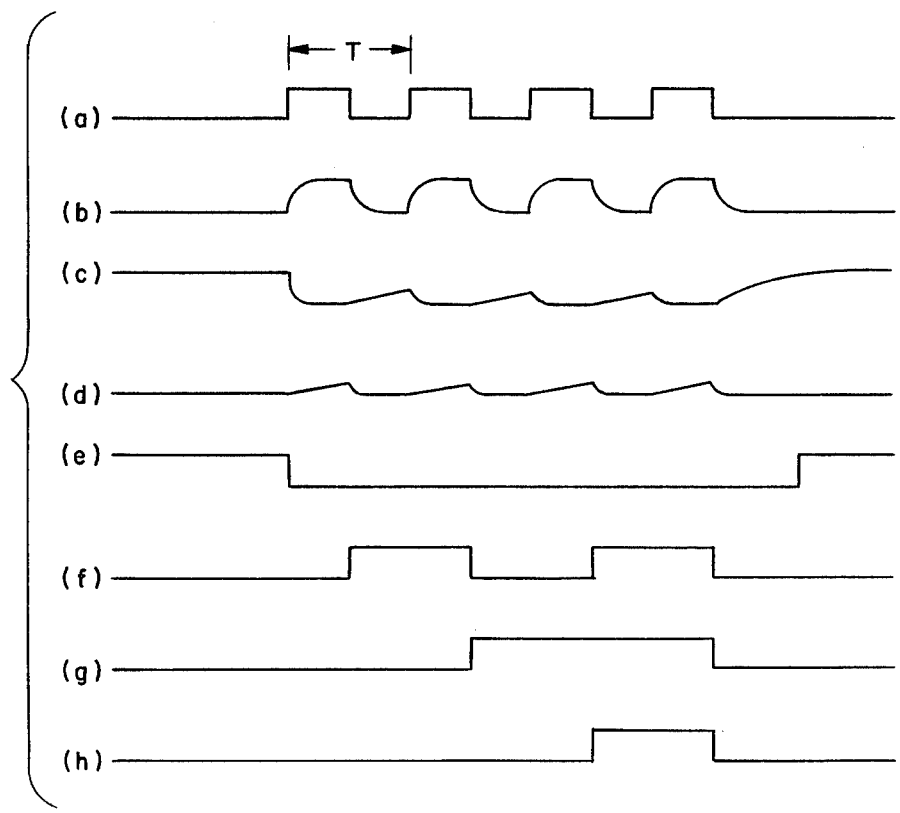
FIG. 5 is an output signal waveform diagram for respective points of the pulse counter circuit shown in FIG. 3 and FIG. 4.

FIG. 4 shows the details of the pulse counter circuit of FIG. 3 and FIG. 5 shows the output signal waveforms for explaining the operation of the circuit. A resistor R1 and capacitor C1 form the filter 91; an inverter G1, diode D1, resistor R2, and capacitor C2 form the idle condition detecting circuit 92; a Diode D2, resistor R3 and capacitor C3 form the continues signal condition detecting circuit 93; an OR circuit G2 corresponds to the OR circuit 94; a counter CTR corresponds to the counter 95 and the AND circuit G3 corresponds to the judgment output circuit 96.

When the pulse with period T shown in FIG. 5(a) is input, an output signal shown in FIG. 5(b) is obtained as the output of the filter 91 consisting of the resistor R1 and capacitor C1 and it is applied to the clock terminal CK of counter CTR. Moreover, when the input signal is "1", an output of invertor G1 becomes "0" and the capacitor C2 discharges via the diode D1. Therefore, its terminal voltage rapidly drops. When the input signal is "0", an output of invertor G1 becomes "1", and the capacitor C2 is charged via the resistor R2. Therefore, the terminal voltage of capacitor C2 increases governed by the time constant of C2 R2. Consequently, since the input signal is "0" in the idle condition, an output signal of the idle condition detecting circuit 92 becomes "1" and when the pulse signal shown in FIG. 5(a) is input, the output signal shown in FIG. 5(c) is obtained.

When the input signal is "1", the capacitor C3 is charged via the resistor R3 and the terminal voltage of capacitor C3 increases governed by the time constant of C3 R3. When the input signal is "0", the capacitor C3 discharges via the diode D2. Therefore, when the input signal "1" is continuous, the output signal of continuous signal condition detecting circuit 23 becomes "1", but when the pulse signal shown in FIG. 5(a) is input, the output signal shown in FIG. 5(d) is obtained.

An output signal from the OR circuit G2 (94) is a logical sum (OR) of the signals of FIGS. 5(c) and 5(d) and become "1" for an input signal higher than the gate threshold level, and the signal "0" is applied to the reset terminal R of the counter CTR for the input period of the pulse. Therefore, the counter CTR counts the pulse and its output terminals $Q_1$ and $Q_2$ output the signals shown in FIGS. 5(f) and 5(g). When both outputs become "1", namely, when three pulse signals are counted, the output signal of AND circuit G3 becomes "1" as shown in FIG. 5(h) and the charging signal generating circuit 10 is started by this output signal.

The filter 91 does not require a structure more complicated than that necessary for allowing the pulse signal of period T to pass and is capable of employing various structures other than that comprising the resistor R1 and capacitor C1. The time constant determined by the resistor R2 and capacitor C2 of the idle condition detecting circuit 92 and that determined by the resistor R3 and capacitor C3 of the continuous signal condition detecting circuit 93 are selected to be equal or larger than the period T of the pulse signal and, thereby, a momentary impulse signal due to noise in the out-of-band frequency and a continuous signal can be distinguished. Moreover, the judgment output circuit 96 can employ a logical circuit structure having the flexibility of using a predetermined count vaue such as 3 to 5 pulses and not detecting, therefore, the extremely small values of 0 to 2 and an extremely large value of 6 or larger.

In an ordinary radio transmitter, a limiter circuit which limits the amplitude of an input signal is provided in the stage preceding the modulator and thereby the operation in a dynamic range proper for the capability of the modulator can be realized. As a result, the charging signal carrier superimposed on the voice signal higher than the specified level may sometimes disappear because of such a limiter circuit in a case where the charging signal carrier is only superimposed on the voice signal and it is transmitted after modulation.

For this reason, if the voice signal is subjected to sufficient amplitude limitation and, thereafter, the charging signal carrier is superimposed thereon, the signal can be transmitted without degradation of the charging signal carrier caused by this limiter circuit.

However, excessive amplitude limitation of a voice signal deteriorates the quality of the voice signal and results in a drastic reduction of the S/N ratio.

In the present invention, the voice signal is subjected to a comparatively large amplitude limitation only for the period when the charging signal carrier will be superimposed. Thereafter, the charging signal carrier is superimposed unto the voice signal. Thus, such a charging signal can be transmitted as the radio signal via the limiter circuit and modulator in the same way as in the ordinary radio transmitting equipment.

Figure 6:
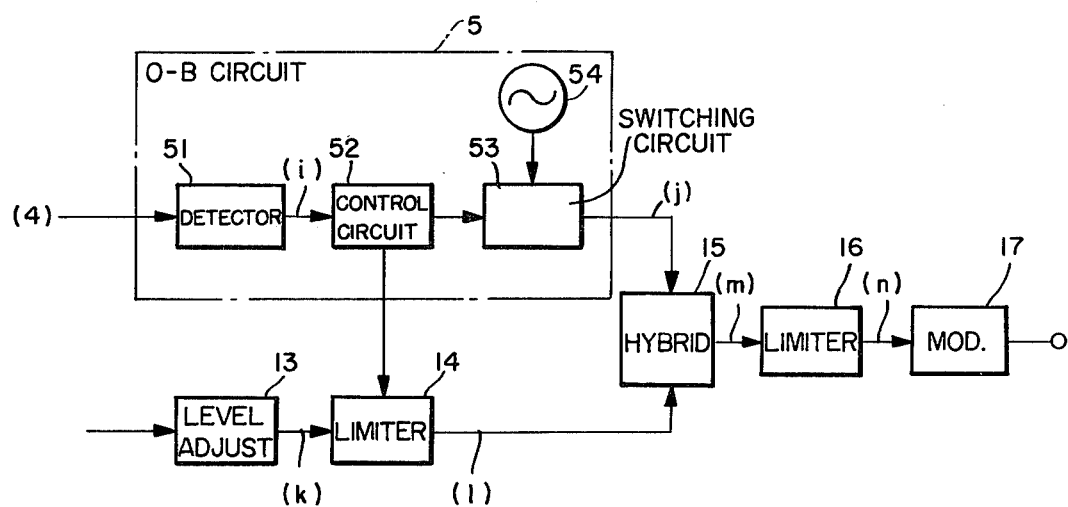
FIG. 6 is a block diagram of a principal portion of the radio equipment on the exchange side used in the present invention.

FIG. 6 shows a principal portion of the radio equipment of the present invention, namely, the transmitter part provided in the exchange side. In FIG. 6, 51 is a detector circuit comprising an amplifier which detects an output sent from the pulse encoding circuit 4 provided in the preceding stage and then sends it to the control circuit 52 as the signal at the specified level. The first limiter circuit 14 is operated by the control circuit 52 in synchronization with the input pulse code signal. 53 is a switching circuit which provides an output from an oscillator 54 oscillating at the specified out-of-band frequency (for example, 3825 Hz) in synchronization with the input pulse code signal. 15 is a hybrid circuit for combining signals, which combines the out-of-band frequency signal sent from the switching circuit 53 and the voice signal amplitude-limited by the first limiter circuit 14 and sends the combined signal to the modulator 17 via the second limiter circuit 16. The second limiter circuit 6 and the modulator 17 have the same structure as that used in ordinary radio equipment. For example, a phase-modulated or a frequency-modulated signal is generated. The detecting circuit 51, control circuit 52, switching circuit 53 and oscillator 54 comprise the out-of-band frequency generating circuit 5 shown in FIG. 1. Sometimes, the detecting circuit 51 can be eliminated depending on the input pulse code (for example, when it has a sufficient level), and the signal sent from the pulse encoding circuit can be directly input into the control circuit 52. In addition, 13 is a level adjusting circuit used in ordinary radio equipment and it is used for adjusting the level of the input voice signal in accordance with the degree of modulation.

Figure 7:
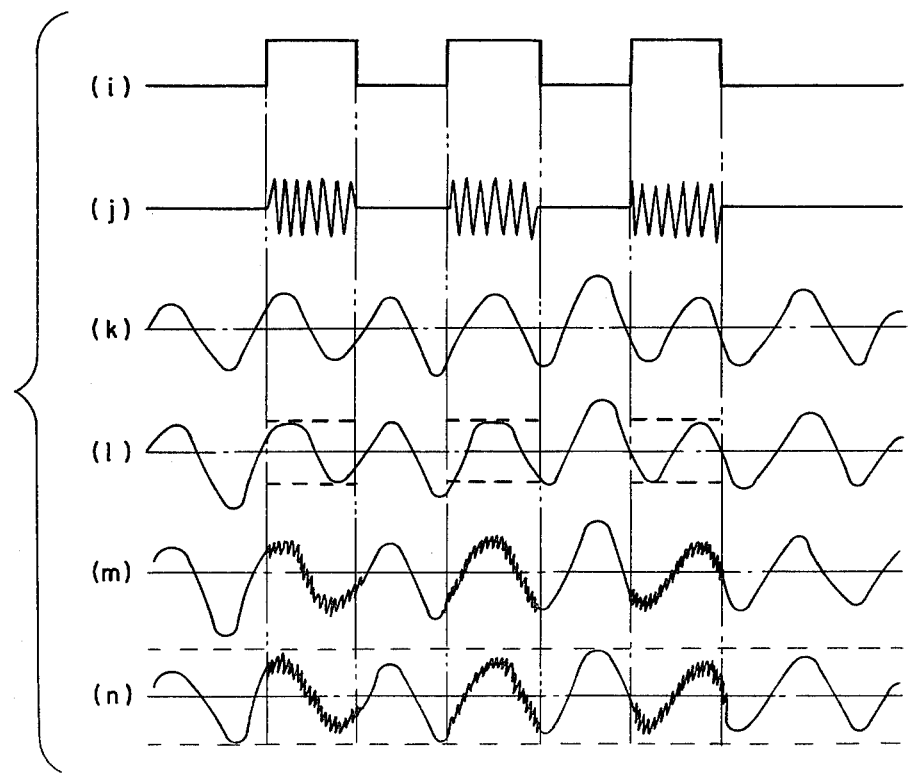
FIG. 7 is a waveform diagram for respective points in the block diagram of FIG. 6.

The operation of the circuits shown in FIG. 6 is explained by referring to output waveforms in FIG. 7. As shown in FIG. 7(i), the control circuit 52 operates in synchronization with the pulse code signal, opening the switching circuit 53 for the specified time interval. Thereby, as shown in FIG. 7(j), the control circuit 52 causes the oscillator 54 to output of the out-of-band frequency signal (3825 Hz) and also controls the first limiter circuit 14 in order to limit the level of the voice input signal (FIG. 7(k)) to the level indicated by the dotted line of FIG. 7(l) only for the specified period. Thereafter, the amplitude limitation level of the first limiter circuit 14 is determined when the high frequency (3825 Hz) charging signal carrier is superimposed on the voice signal to such a degree that the superimposed charging signal carrier is not removed by the second limiter circuit 16. FIG. 7(k) shows the voice signal before amplitude limitation is executed and FIG. 7(l) shows the voice signal after the amplitude limitation is executed by the first limiter circuit 14. Since the amplitude limitation by the first limiter circuit 14 is executed only for the period of superimposition of the charging signal carrier, the S/N ratio of the voice signal is not significantly deteriorated.

After the charging signal carrier, of FIG. 7(j) output from the switching circuit 53, as explained above, and the voice signal, of FIG. 7(l) output from the first limiter circuit 14, are combined by the hybrid circuit 15, the signal shown in FIG. 7(m) is obtained. This signal is amplitude-limited by the second limiter circuit 16 and is modulated by the modulator 17 as in the case of ordinary radio signal transmission. In the amplitude limitation by the second limiter circuit 16, an input signal higher in amplitude than the specified level is removed as shown in FIG. 7(n), however, the band limitation by the first limiter circuit 14 is already executed at the timing where the charging signal carrier is superimposed and here no input signal is removed. Therefore, the charging signal carrier to be superimposed does not disappear, thereby improving the reliability of charging signal transmission. Simultaneously, a comparatively large amplitude limitation is carried out by the first limiter circuit 14 only at the timing where the charging signal carrier is superimposed and the S/N ratio when no charging signal carrier is transmitted is not deteriorated thereby.

As explained above, this invention discloses that the charging signal is transmitted as the out-of-band frequency signal by providing the charging signal detecting circuit 3 which detects the charging signal sent from the exchange 1 and encodes it into the pulse code signal comprising a plurality of continuous pulses. Means composed of the pulse encoding circuit 4 and means such as the out-of-band frequency generating circuit 5, etc., modulate the pulse code signal using the out-of-band frequency, such as 3825 Hz, in the radio equipment 2 on the side of exchange 1. The charging signal sent from the exchange is received and regenerated by providing means, such as the out-of-band frequency detection circuit 8, which detects the out-of-band frequency signal and demodulates it into thee pulse code signal, the counter circuit 9 which counts the continuous pulses of the pulse code signal and means, such as the charging signal generating circuit 10, which represents the charging signal when the counter value reaches the predetermined content in the radio equipment 7 on the telephone side. Since the charging signal carrier, transmitted together with the voice signal, is transmitted as the out-of-band frequency signal, it does not influence the voice signal. Since the 50 Hz, 12 kHz, 16 kHz or polarity-inverted charging signals are encoded into pulse code signals and the charging signal is distinguished by counting the specified number of continuous pulses on the telephone side, misrecognition because of FM noise, ignition noise, etc. does not occur, and, thereby, reliability of the transmission of the charging signal can be very much inproved.

In addition, reliable transmission of the charging signal is realized in the S/N ratio in the case of not transmitting the charging signal carrier it not lowered because the amplitude limiting of only a specified portion of the voice signal occurs in synchronization with the charging signal carrier Therefore, it is also possible to raise the reliability of the charging signal while maintaining the quality of the voice signal.

We claim:
1. A method for transmitting a charging signal over a radio link between an exchange and a telephone system, comprising the steps of:
    detecting the charging signal sent from the exchange and generating a detected signal;
    encoding the detected signal into a pulse code signal comprising a plurality of continuous pulses;
    modulating the pulse code signal into a modulated pulse code signal with a carrier comprising a frequency signal outside a voice transmitting frequency band;

transmitting the modulated pulse code signal to the telephone system via the radio link after the modulated pulse code signal is superimposed onto a voice signal;

detecting the demodulating the modulated pulse code signal into the pulse code signal in the telephone system;

producing a counted value by counting the continuous pulses of the pulse code signal; and regenerating the charging signal, when the counted value reaches a predetermined value.

2. A method for transmitting a charging signal according to claim 1, wherein a radio signal to be transmitted by the radio link from the exchange to the telephone system is modulated by phase-modulation.

3. A method for transmitting a charging signal according to claim 1, wherein a radio signal to be transmitted by the radio link from the exchange to the telephone system is modulated by frequency-modulation.

4. A method for transmitting a charging signal according to claim 1, 2 or 3, wherein the telephone system includes a counter circuit, an idle condition detecting circuit and a continuous signal detecting circuit, and wherein said continuous pulses of said pulse code signal are counted by the counter circuit which is reset by an output from among the idle condition detecting circuit and the continuous signal condition detecting circuit.

5. A method for transmitting a charging signal according to claim 1, 2 or 3, further comprising the steps of:

executing a first amplitude limitation on the voice signal onto which the modulated pulse code signal has not yet been superimposed and in synchronization with the modulated pulse code signal to be superimposed later;

superimposing the modulated pulse code signal onto the voice signal;

executing a second amplitude limitation on the voice signal onto which the modulated pulse code signal has been superimposed;

inputting the voice signal upon which the second amplitude limitation has been executed into a modulator; and transmitting the modulated voice signal onto which said modulated pulse code signal has been superimposed to the telephone system.

6. A method for transmitting a charging signal according to claim 5, wherein the first amplitude limitation is executed such that the pulse code signal is present after the second amplitude limitation level is deeper than the amplitude of the modulated pulse code signal which is superimposed later.

* * * * *

UNITED STATES PATENT AND TRADEMARK OFFICE
CERTIFICATE OF CORRECTION

PATENT NO. : 4,485,270
DATED : NOVEMBER 27, 1984
INVENTOR(S) : ISAO HONDA ET AL.

It is certified that error appears in the above-identified patent and that said Letters Patent is hereby corrected as shown below:

Col. 2, line 14, "threafter" should be --thereafter--.

Signed and Sealed this

Sixteenth Day of July 1985

[SEAL]

Attest:

DONALD J. QUIGG

Attesting Officer     Acting Commissioner of Patents and Trademarks